United States Patent [19]
Love

[11] 3,787,994
[45] Jan. 29, 1974

[54] FISH HOOK SETTER
[75] Inventor: Olen J. Love, Tulia, Tex.
[73] Assignees: H. H. Malone; Gary Malone, both of Tulia, Tex.; part interest to each
[22] Filed: Dec. 14, 1972
[21] Appl. No.: 315,185

[52] U.S. Cl. ......................................... 43/15, 43/19
[51] Int. Cl. ........................ A01k 97/12, A01k 91/02
[58] Field of Search ............................ 43/15, 16, 19

[56] References Cited
UNITED STATES PATENTS

| | | | |
|---|---|---|---|
| 2,799,110 | 7/1957 | Miller, Sr. | 43/15 |
| 1,383,474 | 7/1921 | Lucas | 43/15 |
| 3,457,665 | 7/1969 | Duvall et al. | 43/15 |
| 1,996,704 | 4/1935 | Hawkinson | 43/15 X |
| 1,295,448 | 2/1919 | Dingwell | 43/15 |
| 2,316,256 | 4/1943 | Kohn | 43/15 |
| 2,932,111 | 4/1960 | Kremski et al. | 43/19 |

Primary Examiner—Louis G. Mancene
Assistant Examiner—James H. Czerwonky
Attorney, Agent, or Firm—Wendell Coffee

[57] ABSTRACT

A fish hook setter has a capped barrel attached to a fishing rod with a notched plunger extending through a keyhole slot in the cap. A clip on the end of the plunger is above a line guide eye on the rod so a pull on the fish hook pulls the end of the plunger down and disengages the notch in the keyhole slot so the plunger may be spring retracted into the barrel.

7 Claims, 5 Drawing Figures

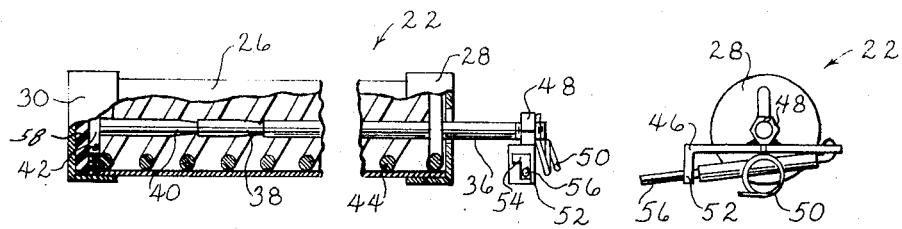
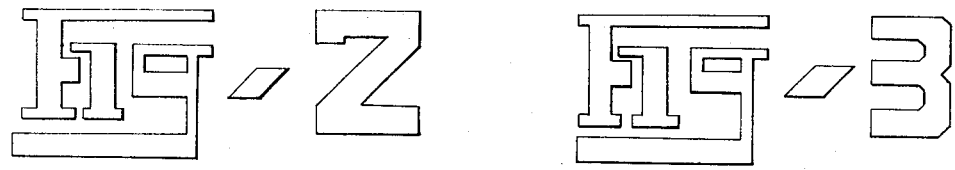
FIG-2  FIG-3
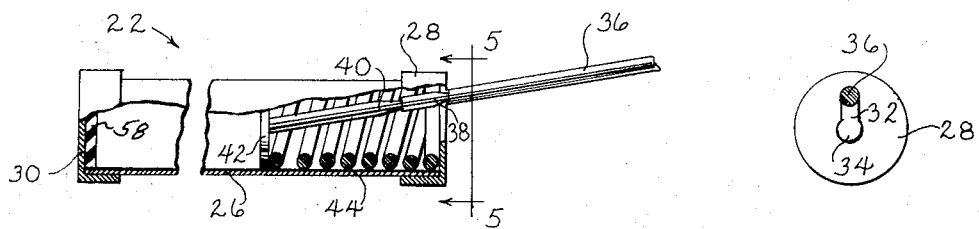
FIG-4  FIG-5

FISH HOOK SETTER

BACKGROUND OF THE INVENTION:

1. Field of the Invention.

This invention relates to fishing and more particularly to automatic hook setters. (43/15)

2. Description of the Prior Art.

Before my invention, other people have developed devices to attach to fishing rods to automatically set the fish hook.

The following U. S. Patents were considered in the preparation of this application.

Jenkins — 2,612,713
Miller — 2,779,110
Setterdahl — 2,850,831
Modica — 2,932,109
McCoy — 3,314,185
Duvall — 3,457,665

SUMMARY OF THE INVENTION

1. New and Different Function.

I have invented a fish hook setter which is light in weight and is readily attachable to a fishing rod. The rod can be used with or without the automatic hook setter attached thereto. The automatic setter is readily adaptable to have either one of two pulls exerted thereby. Also, the line is clamped to the plunger of the setter by a pin which is engaged in an L-shaped slot.

2. Objects of this Invention.

An object of this invention is to automatically set a fish hook attached to the line of a fishing rod.

Other objects are to achieve the above with a device that is sturdy, compact, durable, lightweight, simple, safe, efficient, versatile, and reliable, yet inexpensive and easy to manufacture, install, adjust, operate, and maintain.

The specific nature of the invention, as well as other objects, uses, and advantages thereof will clearly appear from the following description and from the accompanying drawing, the different views of which are not necessarily to the same scale.

BRIEF DESCRIPTION OF THE DRAWING;

FIG. 2 is a foreshortened side elevational view of the fish hook setter with parts broken away for clarity and shown in the relaxed position, the clip means shown inverted.

FIG. 3 is an end elevationsl view of the automatic setter, showing details of the clip means, which is inverted.

FIG. 4 is a foreshortened elevational view of the setter partially broken away for clarity shown in the cocked or extended position with the clip means removed.

FIG. 5 is a sectional view taken substantially on line 5—5 of FIG. 4.

DESCRIPTION OF THE PREFERRED EMBODIMENT

Figure 1:
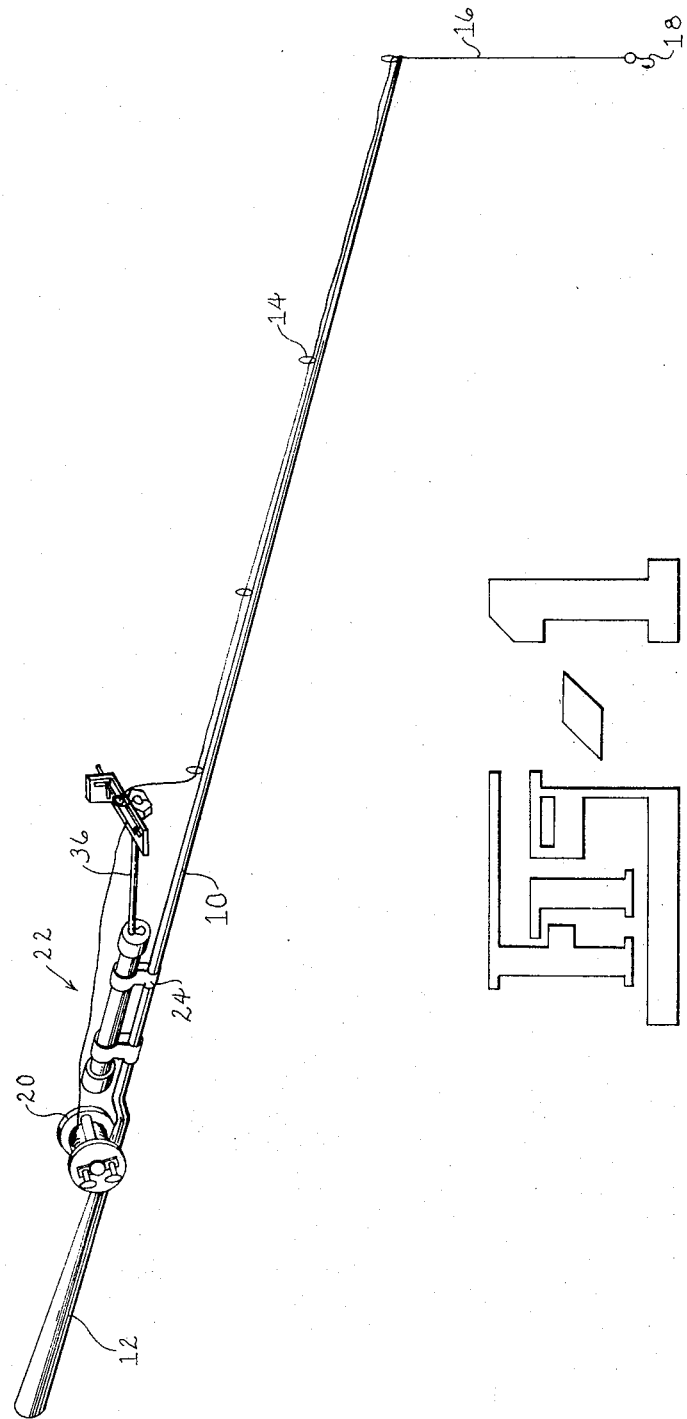
FIG. 1 is a perspective view of a fishing rod with reel and line and attached thereto, a fish hook setter according to this invention.

Referring more particularly to FIG. 1 of the drawing, there may be seen fishing rod or pole 10.

The pole 10 is quite conventional, having handle 12 for flotation and having rings or line guide eyes 14. Line 16 extends from fish hook 18 attached on one end to reel 20 attached at the handle 12 of the pole. My automatic device 22 is more readily seen by referring to FIGS. 2, 3, 4, and 5. It is attached by clamp means 24 which is attached to barrel 26 as by spot welding. Inasmuch as clamps are well known and those with ordinary skill in the art will understand in detail how to clamp tubular devices onto fishing rods or poles, it has not been described in detail here except to note that it is easily attached and detached from the pole.

Referring more particularly to the device 22, the main body is formed with tubular barrel 26. The forward end of the barrel is closed by cap 28, which, after permanent assembly, is attached in place as by spot welding. The other end of the barrel 26 is closed with end cap 30. The cap 28 has keyhole slot therein. The keyhole slot has two portions: diametrically elongated slot 32 opening into central hole 34. The central hole 34 has a larger diameter than the elongated slot 32. It is noted that not only is the elongated slot 32 diametrical with respect to the circular cap 28, but also when the device 22 is attached to the pole 10, the elongated slot 32 is diametrically outward from the pole 10, i.e., the central hole 34 is on the side of the pole 10 and the elongated slot 32 extends diametrically outward therefrom. Inasmuch as the clamp means 24 is permanently attached to the barrel 26, anytime the device 22 is attached to the pole 10, the elongated slot 32 will have this diametrical relationship to the pole.

Plunger 36 is an elongated rod. The diameter of the plunger 36 is larger than the elongated slot 32, but smaller than the central hole 34. Two notches 38 and 40 are cut in the plunger spaced from plate 42, which is attached to the end of the rod 36 within the barrel 26. As seen in the drawing, each of the notches 38 and 40 have radial shoulders. The diameter of each of the notches is smaller than the elongated slot 32. Compression spring 44 extends from the cap 28 to the plate 42 so it biases the plunger 36 into the barrel 26.

Therefore, it may be seen that if the plunger is extended or cocked and then the end of the plunger 36 lifted with one of the notches 38 or 40 extending into the elongated slot 32, the plunger will be held in this position. Also, if the notch 40 is engaged in the keyhole slot, there will be greater pressure upon the plunger 36 so it snaps back with greater force than if the plunger is attached with the notch 38 in the keyhole slot as illustrated in FIG. 4. Also, if the plunger 36 is pulled down, i.e., the end of the plunger is brought toward the pole 10, the plunger 36 will be aligned with the central hole 34 and the spring 44 will snap the plunger into the barrel.

Clip means is attached to the distal end of the plunger 36, i.e., the end of the plunger outside of the barrel 26. When the device 22 is attached to the pole 10, it may be seen that the clip means is adjacent to one of the line guide eyes 14 and above and slightly to the rear of the eye 14. Therefore, the slightest pull on the hook 18 will pull the plunger 36 down so the notch disengages the keyhole slot and thus setting the hook 18. Rubber pad or disc 58 cushions the blow against the end of cap 30.

The clip means includes bracket 46, which is attached to nut 48, which is threaded onto the end of the plunger 36. Wire loop 50 extends through a hole drilled diametrically through the end of the plunger 36 so both the guide loop 50 and the nut 48 are held securely in place. A thin locking nut could also be used. The ear 52 is bent down from the main portion of the bracket 46. Pin 56 extends from the opposite end of the bracket 46 to the ear 52 and through the L-shaped slot 54. Therefore, the line 16 may be extended through the loop 50 and by manipulation of the pin 56 in the L-shaped slot 54, the line 16 may be either securely clamped in place or quickly released according to the desires of the angler.

Therefore, it may be seen that I have fulfilled my objective of providing a simple fish hook setter.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. A hook setter adapted to be attached to
   a. a fishing pole with
   b. guide eyes attached thereto,
   c. a line extending through the eyes, and
   d. a fish hook on the end of the line;
   e. comprising:
   f. a barrel,
   g. a cap on the barrel
   h. a keyhole slot in the cap, including
      i. an elongated diametrical slot opening into
      ii. a central hole with a diameter larger than the slot width,
   j. an elongated plunger extending through the keyhole slot having a diameter
      i. larger than the elongated slot and
      ii. smaller than the central hole, and
   k. a notch on the rod,
      i. smaller than the elongated slot,
   m. a spring attached to the plunger in the barrel biasing the plunger into the barrel,
   n. clip means on the end of the plunger out of the barrel for attaching the line to the plunger,
   o. clamp means on the barrel for clamping the barrel to the pole, and wherein said clip means includes:
   p. a bracket on the end of the plunger,
   q. an ear on the bracket,
   r. an L-shaped slot in the ear, and
   s. a pin extending through the L-shaped slot so that the line may be releasably attached to the bracket.

2. The invention as defined in claim 1 with additional limitations of
   p. a plate on the end of the plunger in the barrel, and
   q. said spring extending in compression from the cap to the plate.

3. The invention as defined in claim 1 with an additional limitation of
   p. a second notch on the plunger adjacent the first recited notch.

4. The invention as defined in claim 1 wherein
   p. said clamp means is engaged with said pole,
   q. the pole and barrel are parallel and
   r. the clip means extends above and to the rear of one of said eyes, and
   s. the keyhole slot extends diametrically outward from the pole,
   to so that a pull on the hook on the line will pull the clip means down so the plunger is aligned with the central hole of the keyhole and the spring will retract the plunger thus setting the hook.

5. The invention as defined in claim 4 with additional limitations of
   u. a plate on the end of the plunger in the barrel, and
   v. said spring extending in compression from the cap to the plate.

6. The invention as defined in claim 4 with an additional limitation of
   u. a second notch on the plunger adjacent the first recited notch.

7. The invention as defined in claim 6 with additional limitations of
   v. a plate on the end of the plunger in the barrel, and
   w. said spring extending in compression from the cap to the plate.

* * * * *